(12) United States Patent
Yang (10) Patent No.: US 10,197,807 B2
(45) Date of Patent: Feb. 5, 2019

(54) HEAD-MOUNTED DISPLAY APPARATUS (71) Applicant: Samsung Display Co., Ltd., Yongin, Gyeonggi-Do (KR)

(72) Inventor: Sumin Yang, Yongin (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/709,732

(22) Filed: Sep. 20, 2017

(65) Prior Publication Data

US 2018/0011325 A1 Jan. 11, 2018

Related U.S. Application Data

(62) Division of application No. 14/612,647, filed on Feb. 3, 2015, now Pat. No. 9,798,146.

(30) Foreign Application Priority Data

Sep. 4, 2014 (KR) ........................ 10-2014-0118016

(51) Int. Cl.
*G02B 5/30* (2006.01)
*G02B 27/01* (2006.01)
*G02F 1/1335* (2006.01)
*G02B 3/08* (2006.01)

(52) U.S. Cl.
CPC ........... *G02B 27/0172* (2013.01); *G02B 3/08* (2013.01); *G02B 5/30* (2013.01); *G02B 5/3058* (2013.01); *G02F 1/133526* (2013.01); *G02F 1/133528* (2013.01); *G02B 2027/0174* (2013.01); *G02B 2027/0178* (2013.01); *G02F 2001/133548* (2013.01)

(58) Field of Classification Search
CPC .................................................. G02B 27/0172
See application file for complete search history.

(56) References Cited

U.S. PATENT DOCUMENTS

| 5,371,556 | A | 12/1994 | Suwa et al. | |
| 6,140,980 | A * | 10/2000 | Spitzer | A61B 3/113 345/8 |
| 8,508,830 | B1 * | 8/2013 | Wang | G02B 3/0006 359/267 |
| 2006/0262242 | A1 * | 11/2006 | Koma | G02F 1/1336 349/69 |
| 2006/0279673 | A1 * | 12/2006 | Tanase | G02F 1/133603 349/67 |
| 2007/0182915 | A1 * | 8/2007 | Osawa | G02B 3/08 349/201 |

(Continued)

FOREIGN PATENT DOCUMENTS

KR 100184001 B1 5/1999

*Primary Examiner* — Sang V Nguyen
(74) *Attorney, Agent, or Firm* — Cantor Colburn LLP (57) ABSTRACT

A head-mounted display apparatus includes a display unit including a plurality of emissive areas which displays images and a plurality of transmissive areas disposed between the emissive areas and which transmits light from external light sources, a first optical element which receives and converges light emitted from the display unit onto a predetermined area, and a second optical element disposed opposite to the first optical element with respect to the display unit and which receives and diverges light incident toward the display unit from an outside.

9 Claims, 7 Drawing Sheets

(56) References Cited

U.S. PATENT DOCUMENTS

| | | | |
|---|---|---|---|
| 2007/0195409 A1* | 8/2007 | Yun | G02B 27/2214 |
| | | | 359/462 |
| 2008/0055536 A1 | 3/2008 | Shimozono | |
| 2008/0182184 A1* | 7/2008 | Zhan | G02F 1/1343 |
| | | | 430/7 |
| 2008/0291531 A1 | 11/2008 | Heimer | |
| 2008/0309835 A1* | 12/2008 | Kuba | G02F 1/133526 |
| | | | 349/1 |
| 2010/0149618 A1 | 6/2010 | Sprague | |
| 2011/0204039 A1 | 8/2011 | De Angelis et al. | |
| 2012/0099034 A1* | 4/2012 | Pijlman | G02B 27/2214 |
| | | | 349/15 |
| 2014/0118829 A1* | 5/2014 | Ma | G02B 5/1885 |
| | | | 359/567 |
| 2014/0153102 A1 | 6/2014 | Chang | |
| 2014/0225078 A1* | 8/2014 | Jeung | H01L 27/3218 |
| | | | 257/40 |
| 2014/0225813 A1* | 8/2014 | Komatsu | G02B 27/0172 |
| | | | 345/8 |
| 2015/0002722 A1 | 1/2015 | Chang et al. | |
| 2015/0205126 A1* | 7/2015 | Schowengerdt | G06T 7/73 |
| | | | 345/633 |

\* cited by examiner

HEAD-MOUNTED DISPLAY APPARATUS

This application is a divisional of U.S. patent application Ser. No. 14/612,647, filed on Feb. 3, 2015, which claims priority to Korean Patent Application No. 10-2014-0118016, filed on Sep. 4, 2014, in the Korean Intellectual Property Office, the disclosure of which is incorporated herein in its entirety by reference.

BACKGROUND

1. Field

One or more embodiments relate to a head-mounted display apparatus, and more particularly, to a see-through head-mounted display apparatus that enables a user to perceive not only an image that is displayed by the see-through head-mounted display apparatus, but also a background at the rear side of the see-through head-mounted display apparatus.

2. Description of the Related Art

In general, a head-mounted display apparatus, which typically has a glasses-like shape or a helmet-like shape and may be mounted on a user's head, enables the user to perceive an image that is displayed in front of the user's eyes. Research on a see-through head-mounted display apparatus that enables a user to perceive not only an image that is displayed in front of the user's eyes but also a background at the rear side of the see-through head-mounted display apparatus has been carried out.

SUMMARY

In a conventional see-through head-mounted display apparatus, a background image may be distorted by an optical element that is disposed between a user's eyes and display apparatus to obtain a shortest focal length.

One or more embodiments include a see-through head-mounted display apparatus, where a background image displayed therethrough is not distorted and a display unit thereof is disposed substantially close to an eye of a user when the head-mounted display apparatus is mounted on the head of the user.

According to exemplary embodiments, a head-mounted display apparatus includes a display unit including a plurality of emissive areas which displays images and a plurality of transmissive areas disposed between the emissive areas and which transmits external light; a first optical element receives and converges light emitted from the display unit onto a predetermined area; and a second optical element disposed opposite side to the first optical element with respect to the display unit which receives and diverges light incident toward the display unit from the outside.

In an exemplary embodiment, an absolute value of a focal length of the first optical element may be substantially equal to an absolute value of a focal length of the second optical element.

In an exemplary embodiment, a focal length of the first optical element may be about 20 centimeters (㎝) or more.

In an exemplary embodiment, the first optical element may include a positive lens, and the second optical element may include a negative lens.

In an exemplary embodiment, at least one of the first optical element and the second optical element may include a Fresnel lens or a holographic optical element ("HOE") lens.

In an exemplary embodiment, the display unit may include a plurality of pixels, and each of the plurality of pixels may include a first emission portion, a second emission portion and a third emission portion, which are disposed in the emissive areas, and a transmissive window which is disposed in the transmissive areas and adjacent to the first emission portion, the second emission portion and the third emission portion.

In an exemplary embodiment, the head-mounted display apparatus may further include a frame which accommodates the display unit, the first optical element, and the second optical element and configured to be mounted on a user's head.

According to exemplary embodiments, a head-mounted display apparatus includes a display unit including a plurality of emissive areas which displays images and a plurality of transmissive areas disposed between the emissive areas and which transmits external light; a first optical element which receives light emitted from the display unit, where the first optical element converts light emitted from the emissive areas into polarized light in a first direction, and converts external light that has been transmitted through the transmissive areas into polarized light in a second direction; and a second optical element which receives light transmitted through the first optical element, where the second optical element converges the polarized light in the first direction onto a predetermined area and transmits the polarized light in the second direction substantially in the same direction as an incident direction thereof on the second optical element.

In an exemplary embodiment, the first optical element may include: a polarizer disposed to correspond to the emissive areas and the transmissive areas; and a liquid crystal layer which receives light transmitted through the polarizer and including a first liquid crystal disposed to correspond to the emissive areas and a second liquid crystal disposed to correspond to the transmissive areas.

In an exemplary embodiment, the second optical element may include: a first medium whose refractive index changes depending on a polarization direction of incident light; and a second medium in contact with the first medium and having a smaller refractive index than a maximum refractive index of the first medium.

In an exemplary embodiment, the first medium may include a liquid crystal.

In an exemplary embodiment, the first optical element may include: a polarizer disposed to correspond to the emissive areas and the transmissive areas; and a λ/2 retarder disposed to correspond to the emissive areas or the transmissive areas.

In one embodiment, the first optical element may include: a first polarizer disposed to correspond to the emissive areas and convert light emitted from the emissive areas into polarized light in the first direction; and a second polarizer disposed to correspond to the transmissive areas and which converts external light transmitted through the transmissive areas into polarized light in the second direction.

In an exemplary embodiment, each of the first polarizer and the second polarizer may include a wire grid polarizer.

In an exemplary embodiment, the display unit may include a plurality of pixels, and each of the plurality of pixels may include a first emission portion, a second emission portion and a third emission portion, which are disposed in the emissive areas, and a transmissive window disposed in the transmissive areas and adjacent to the first emission portion, the second emission portion, and the third emission portion.

In an exemplary embodiment, the head-mounted display apparatus may further include a frame which accommodates the display unit, the first optical element and the second optical element and configured to be mounted on a user's head.

BRIEF DESCRIPTION OF THE DRAWINGS

These and/or other features will become apparent and more readily appreciated from the following detailed description of embodiments thereof, taken in conjunction with the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will now be described with reference to accompanying drawings.

Figure 1:
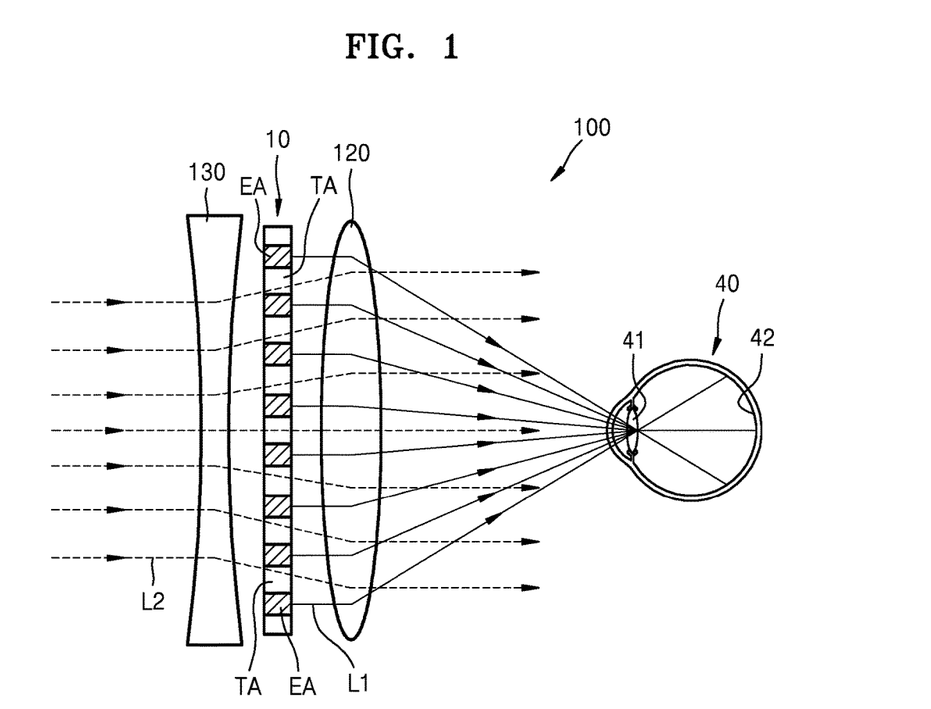
FIG. 1 is a schematic side-sectional view illustrating an exemplary embodiment of a head-mounted display apparatus according to the invention.

FIG. 1 is a schematic side-sectional view illustrating an exemplary embodiment of a head-mounted display apparatus 100 according to the invention.

According to an exemplary embodiment, the head-mounted display apparatus 100 includes a display unit 10 including a plurality of emissive areas EA which displays images and a plurality of transmissive areas TA disposed between the emissive areas EA and which transmits external light, a first optical element 120 disposed in a path of light emitted from the display unit 10 to converge light onto a predetermined area (e.g., a predetermined point or region), and a second optical element or device 130 disposed opposite to the first optical element 120 with respect to the display unit 10 to diverge light incident toward the display unit 10 from the outside. Herein, an optical element may be an optical device including a transmissive optical device which alters traveling direction or the polarization state of light passing therethrough, e.g., a lens or a retarder.

The display unit 10 may be a transparent display which enables a user to perceive not only an image displayed by the display unit 10, but also a background image, and the display unit 10 may include a variety of elements. In one exemplary embodiment, for example, the display unit 10 may include an organic light-emitting display device or a liquid crystal display device. In an exemplary embodiment, where the display unit 10 includes an organic light-emitting display device, the display unit 10 that is flexible may be provided by forming organic light-emitting devices on a flexible substrate.

The first optical element 120 receives light emitted from the display unit 10. In an exemplary embodiment, the first optical element 120 is disposed between the display unit 10 and a user's eyeball 40. Thus, the first optical element 120 may converge light L1 emitted from the emissive areas EA of the display unit 10 on a surface of a crystalline lens 41 of the user's eyeball 40, and then the light converged on the surface of the crystalline lens 41 may pass through the crystalline lens 41 to reach a retina 42 of the user's eyeball 40.

The display unit 10 of the head-mounted display apparatus 100 is disposed in front of the user's eyeball 40. Since a shortest focal length for a person's eyes is generally about 20 centimeters (cm), in case that the display unit 10 is not spaced apart by about 20 cm or more from the user's eyeball 40, it may be difficult for the user to easily and clearly perceive an image that is displayed on the emissive areas EA included in the display unit 10.

In an exemplary embodiment, the first optical element 120 is an optical element that converges incident light. Therefore, in such an embodiment, even when a distance between the display unit 10 and the user's eyeball 40 is less than 20 cm, the user may clearly and easily perceive an image displayed on the emissive areas EA since light emitted from the emissive areas EA is converged on the crystalline lens 41 of the user's eyeball 40 by the first optical element 120.

According to an exemplary embodiment, since a shortest focal length for a person's eyes is generally about 20 cm, a focal length of the first optical element 120 may be about 20 cm or more. The first optical element 120 may include a positive lens, but is not limited thereto. In an exemplary embodiment, the first optical element 120 may include a combination of a variety of lenses that converges parallel light, and the first optical element 120 may vary in lens shape.

In an exemplary embodiment, as described above, the display unit 10 may be a transparent display and may include the transmissive areas TA which transmit external light. In such an embodiment, where the display unit 10 includes the transmissive areas TA, light L2 from a background at the rear side of the head-mounted display apparatus 100 may pass through the head-mounted display apparatus 100 to the user's eyeball 40.

When the light L2 from a background passes through the first optical element 120, a background image may be distorted by the first optical element 120. In an exemplary embodiment, the head-mounted display apparatus 100 may include the second optical element 130, and such a distortion of the background image may be effectively prevented by the second optical element 130.

The second optical element 130 may be disposed opposite to the first optical element 120 with respect to the display unit 10 to diverge the light L2 incident toward the display unit 10 from a background.

The light L2 incident toward the display unit 10 from a background may pass through the second optical element 130 before the display unit 10. When the light L2 from a background is parallel light, the parallel light may be diverged as passing through the second optical element 130, and the light that is diverged may pass through transmissive areas TA of the display unit 10, and thus the light that is diverged may be incident on the first optical element 120.

The light that is diverged and incident on the first optical element 120 may reach the user's eyeball 40 as parallel light by passing through the first optical element 120. As the light L2 from a background sequentially travels through the second optical element 130 and the first optical element 120, a direction of light that is incident on the user's eyeball 40 may be substantially the same as the direction of the light from the background to the head-mounted display apparatus 100, e.g., before passing through the second optical element 130. In an exemplary embodiment, an absolute value of a focal length of the first optical element 120 may be substantially equal to an absolute value of a focal length of the second optical element 130 to allow the direction of light that is incident on the user's eyeball 40 to be substantially the same as the direction of the light from the background to the head-mounted display apparatus 100.

Accordingly, in such an embodiment, the user may easily and clearly recognize not only an image displayed on the emissive areas EA, but also a background image.

In an exemplary embodiment, the second optical element 130 may be composed of a negative lens, but is not limited thereto. In an alternative exemplary embodiment, the second optical element 130 may be a combination of a variety of lenses that diverges parallel incident light, and the second optical element 130 may vary in lens shape.

Figure 2:
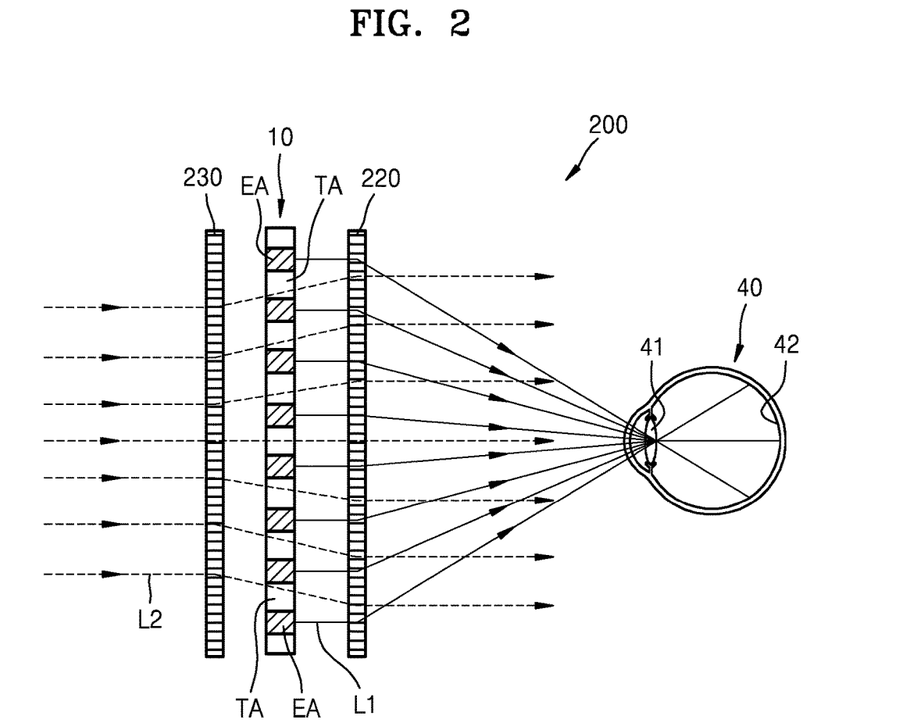
FIG. 2 is a schematic side-sectional view illustrating an alternative exemplary embodiment of a head-mounted display apparatus according to the invention.

FIG. 2 is a schematic side-sectional view illustrating an alternative exemplary embodiment of a head-mounted display apparatus 200 according to the invention.

Referring to FIG. 2, an exemplary embodiment of the head-mounted display apparatus 200 includes the display unit 10 including a plurality of emissive areas EA which displays images and a plurality of transmissive areas TA disposed between the emissive areas EA and which transmits external light, a first optical element 220 which receives light emitted from the display unit 10 to converge light onto a predetermined area, and a second optical element 230 disposed opposite to the first optical element 220 with respect to the display unit 10 to diverge light incident toward the display unit 10 from the outside.

In an exemplary embodiment, the first optical element 220 receives light emitted from the display unit 10. In such an embodiment, the first optical element 220 is disposed between the display unit 10 and the user's eyeball 40. Thus, the first optical element 220 may converge light L1 emitted from the emissive areas EA of the display unit 10 on the crystalline lens 41 of the user's eyeball 40, and thus light converged on the crystalline lens 41 may pass through the crystalline lens 41 to reach a retina 42 of the user's eyeball 40.

In an exemplary embodiment, as shown in FIG. 2, the first optical element 220 may be a planar lens such as a Fresnel lens or a holographic optical element ("HOE") lens. In such an embodiment, the head-mounted display apparatus 200 including the first optical element 220 may have a thin thickness.

In an exemplary embodiment, the first optical element 220 may be spaced apart from the display unit 10 as shown in FIG. 2, but not being limited thereto. In an alternative exemplary embodiment, the first optical element 220 may be attached to the display unit 10.

The second optical element 230 may be disposed opposite to the first optical element 220 with respect to the display unit 10 to diverge the light L2 incident toward the display unit 10 from a background.

The second optical element 230 may be a planar lens such as a Fresnel lens or a HOE lens substantially similar to the first optical element 220. In such an embodiment, the head-mounted display apparatus 200 including the second optical element 230 may have a thin thickness.

A Fresnel lens is a lens obtained by dividing a conventional lens into concentric annular sections. The Fresnel lens may have a reduced thickness compared to the conventional lens. An HOE lens includes a diffraction pattern, and thus the HOE lens may diffract incident light to converge or diverge as conventional lenses do.

In an exemplary embodiment, the first optical element 220 and the second optical element 230 of the head-mounted display apparatus 200 may include a planar lens such as a Fresnel lens or an HOE lens to reduce a thickness and weight of the head-mounted display apparatus 200. However, the invention is not limited thereto. In one alternative exemplary embodiment, for example, only one of the first optical element 220 and the second optical element 230 may include a planar lens. In another alternative exemplary embodiment, the first optical element 220 and the second optical element 230 may include any other type of diffraction optical element that converges or diverges light.

Figure 3:
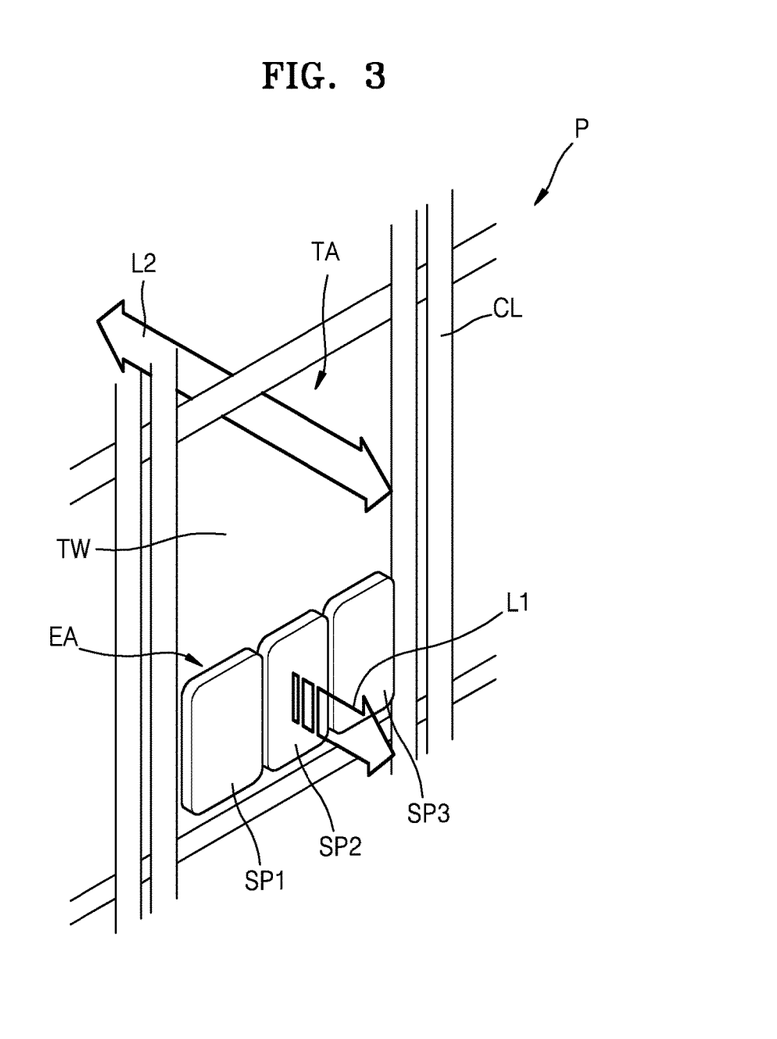
FIG. 3 is a conceptual perspective view illustrating a pixel in a display unit of the head-mounted display apparatus of FIG. 1.

FIG. 3 is a conceptual perspective view illustrating a pixel in a display unit of the head-mounted display apparatus 100 of FIG. 1.

Referring to FIG. 3, the display unit 10 (see FIG. 1) may include a plurality of pixels P. Each of the pixels P includes a first emission portion SP1, a second emission portion SP2 and a third emission portion SP3, which are disposed in the emissive areas EA, and a transmissive window TW that is disposed in the transmissive areas TA and adjacent to the first emission portion SP1, the second emission portion SP2 and the third emission portion SP3.

In an exemplary embodiment, the first emission portion SP1, the second emission portion SP2 and the third emission portion SP3 may each emit light of predetermined color. In an exemplary embodiment, the first emission portion SP1, the second emission portion SP2 and the third emission portion SP3 may emit light of different colors from each other, and a combination of the light of the different colors emitted from the first emission portion SP1, the second emission portion SP2 and the third emission portion SP3 may realize white light. In one exemplary embodiment, for example, the first emission portion SP1, the second emission portion SP2 and the third emission portion SP3 may respectively emit light of three primary colors, e.g., red light, green light and blue light, but not being limited thereto.

The light L1 emitted from the first emission portion SP1, the second emission portion SP2 or the third emission portion SP3 may be refracted when passing through the first optical element 120 of FIG. 1 to be converged on the user's eyeball 40 of FIG. 1.

The transmissive window TW may be defined by an area where only a transparent insulating layer and/or a transparent electrode are disposed, and thus the transmissive window TW transmits light incident on the display unit 10 from a background. The transmissive window TW may have a higher transmittance than other areas of the display unit 10 (see FIG. 1). The transmissive window TW may be divided into a plurality of parts by connection lines CL, which applies power or an electrical signal to the first emission portion SP1, the second emission portion SP2 and the third emission portion SP3. The connection lines CL may include a scan line, a data line or a power line, for example.

The light L2 incident toward the display unit 10 from a background may pass sequentially through the second optical element 130 (FIG. 1), the transmissive areas TA of the display unit 10 (see FIG. 1) and the first optical element 120 (see FIG. 1) toward the user's eyeball 40 (see FIG. 1).

Figure 4:
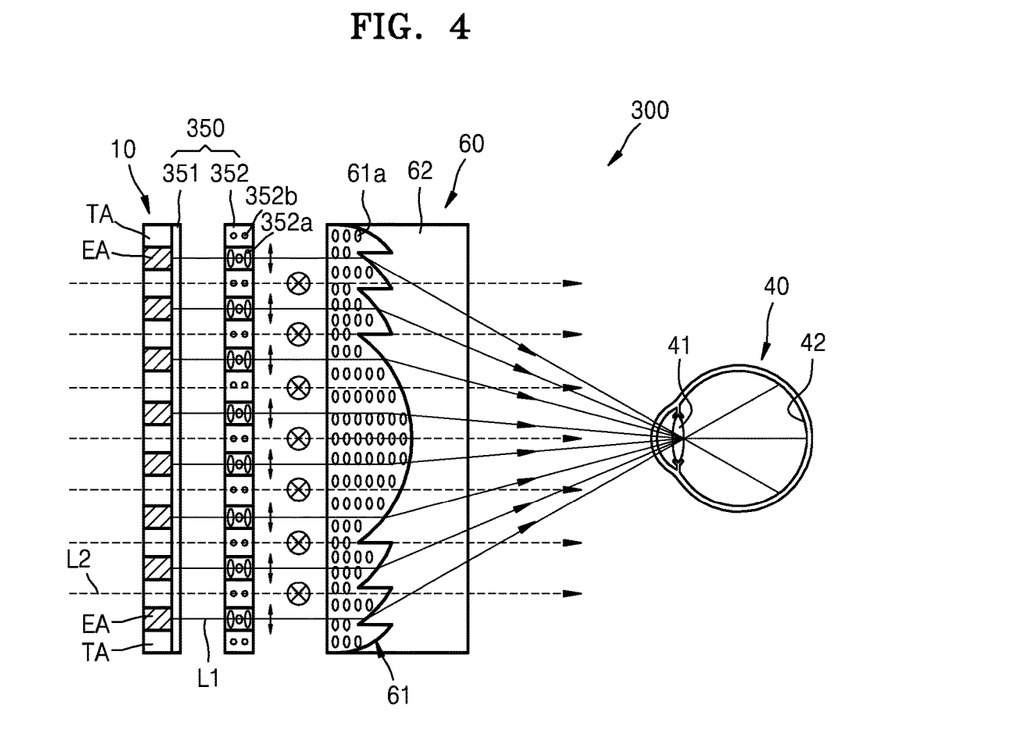
FIG. 4 is a schematic side-sectional view illustrating another alternative exemplary embodiment of a head-mounted display apparatus according to the invention.

FIG. 4 is a schematic side-sectional view illustrating another alternative exemplary embodiment of a head-mounted display apparatus 300 according to the invention.

Referring to FIG. 4, an exemplary embodiment of the head-mounted display apparatus 300 includes the display unit 10 including a plurality of emissive areas EA which displays images and a plurality of transmissive areas TA disposed between the emissive areas EA and which transmits external light, a first optical element 350 which receives light emitted from the display unit 10, converts light L1 emitted from the emissive areas EA into polarized light in a first direction and converts external light L2 transmitted through the transmissive areas TA into polarized light in a second direction perpendicular to the first direction, and a second optical element 60 which receives light transmitted through the first optical element 350 and converges the polarized light in the first direction onto a predetermined area and transmits the polarized light in the second direction without changing a traveling direction thereof, e.g., substantially in the same direction as an incident direction thereof on the second optical element 60.

The display unit 10 may be a transparent display which enables a user to perceive not only an image displayed on the display unit 10, but also a background image, and the display unit 10 may include a variety of elements. In one exemplary embodiment, for example, the display unit 10 may include an organic light-emitting display device or a liquid crystal display device.

The light L1 emitted from the emissive areas EA and the external light L2 that is transmitted through the transmissive areas TA may each pass the first optical element 350 and may be polarized in directions perpendicular to each other.

In an exemplary embodiment, the first optical element 350 may include a polarizer 351 disposed on both the emissive areas EA and the transmissive areas TA, a liquid crystal layer 352 which receives light passed the polarizer 351 and including a first liquid crystal 352a disposed to correspond to (e.g., to cover or to overlap) the emissive areas EA and a second liquid crystal 352b disposed to correspond to the transmissive areas TA.

Light incident on the polarizer 351 from the emissive areas EA and the transmissive areas TA may be polarized in a predetermined direction. The light L1 emitted from the emissive areas EA is transmitted through the polarizer 351 and is incident on the first liquid 352a, and may be converted into polarized light in the first direction by the first liquid 352a. The external light L2 that has been transmitted through the transmissive areas TA is transmitted through the polarizer 351 and is incident on the second liquid 352b, and may be converted into polarized light in the second direction by the second liquid 352b.

In an alternative exemplary embodiment, light transmitted through the polarizer 351 may be polarized light in the second direction. The second liquid crystal 352b may be arranged substantially in the same as the second direction or in a direction perpendicular to the second direction. The polarized light in the second direction that is transmitted through the polarizer 351 may be transmitted through the second liquid 352b without changing a polarization direction due to the second liquid crystal 352b. The first liquid crystal 352a may be arranged in any direction or in a spiral form instead of in the second direction or in a direction perpendicular to the second direction. A polarization direction of the polarized light in the second direction that has been transmitted through the polarizer 351 may be changed by the first liquid crystal 352a. By adjusting a thickness and an arrangement direction of the first liquid crystal 352a, light that has been transmitted through the first liquid crystal 352a may be polarized in the first direction perpendicular to the second direction. However, the invention is not limited thereto. In one exemplary embodiment, for example, light that has been transmitted through the polarizer 351 may be polarized in the first direction instead of the second direction. A polarization direction of the polarized light that has been transmitted through the polarizer 351 may not be changed by the first liquid crystal 352a, but may be changed 90 degrees by the second liquid 352b.

According to an exemplary embodiment, the second optical element 60 may include a first medium 61 whose refractive index changes depending on the polarization direction of incident light and a second medium 62 which is in contact with the first medium 61 and has a smaller refractive index than a maximum refractive index of the first medium 61.

A boundary surface between the first medium 61 and the second medium 62 may include a convex shape in a direction toward the user's eyeball 40. In one exemplary embodiment, for example, the boundary surface may have substantially the same shape as a surface of a Fresnel lens, but not being limited thereto.

The first medium 61 may include a liquid crystal 61a. The refractive index of the liquid crystal 61a of the first medium 61 may be different depending on an arrangement direction of the liquid crystal 61a of the first medium 61 and the polarization direction of incident light. In one exemplary embodiment, for example, the liquid crystal 61a of the first medium 61 may have a refractive index of about 1.7 with respect to polarized light in the first direction and a refractive index of about 1.5 with respect to polarized light in the second direction. The second medium 62 may be composed of glass or plastic and have a refractive index of about 1.5.

In such an embodiment, light polarized in a first direction may be refracted at the boundary surface between the first medium 61 and the second medium 62. That is, light emitted from the emissive areas EA may be refracted at the boundary surface between the first medium 61 and the second medium 62, and be converged on the crystalline lens 41 of the user's eyeball 40.

In such an embodiment, light polarized in the second direction may not be refracted at the boundary surface between the first medium 61 and the second medium 62, and be transmitted through the second optical element 60 in substantially the same as a direction of incident light, and fall on the user's eyeball 40.

In such an embodiment, the head-mounted display apparatus 300 may allow the user to easily and clearly recognize not only an image displayed on the emissive areas EA, but also a background image without distortion.

Figure 5:
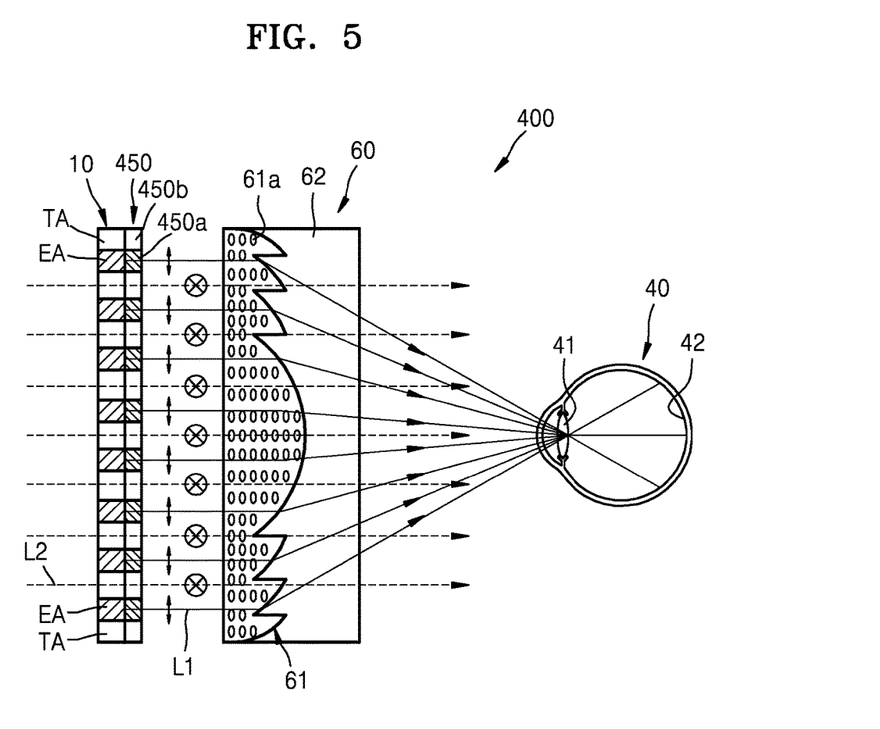
FIG. 5 is a schematic side-sectional view illustrating another alternative exemplary embodiment of a head-mounted display apparatus according to the invention.

FIG. 5 is a schematic side-sectional view illustrating another alternative exemplary embodiment of a head-mounted display apparatus 400 according to the invention.

Referring to FIG. 5, an exemplary embodiment of the head-mounted display apparatus 400 includes the display unit 10 including a plurality of emissive areas EA which displays images and a plurality of transmissive areas TA disposed between the emissive areas EA and which transmits external light, a first optical element 450 which receives light emitted from the display unit 10, converts light L1 emitted from the emissive areas EA into polarized light in a first direction and converts external light L2 transmitted through the transmissive areas TA into polarized light in a second direction perpendicular to the first direction, and a second optical element 60 which receives light that has been transmitted through the first optical element 450, converges the polarized light in the first direction onto a predetermined area and transmits the polarized light in the second direction substantially in the same direction as an incident direction thereof on the second optical element 60.

The first optical element 450 may include a first polarizer 450a disposed to correspond to the emissive areas EA and which converts the light L1 emitted from the emissive areas EA into polarized light in the first direction, and a second polarizer 450b disposed to correspond to the transmissive areas TA and which converts the external light L2 transmitted through the transmissive areas TA into polarized light in the second direction.

The first polarizer 450a and the second polarizer 450b may each be a wire grid polarizer and may be alternately arranged with each other on the display unit 10. The wire grid polarizer may be an array of fine metal wires arranged substantially parallel to each other, which may be efficiently provided by a patterning process.

The display unit 10 and the second optical element 60 shown in FIG. 5 may have substantially the same configuration as the configuration in the head-mounted display apparatus 300 of FIG. 4, and any repetitive detailed description thereof will be omitted.

Figure 6:
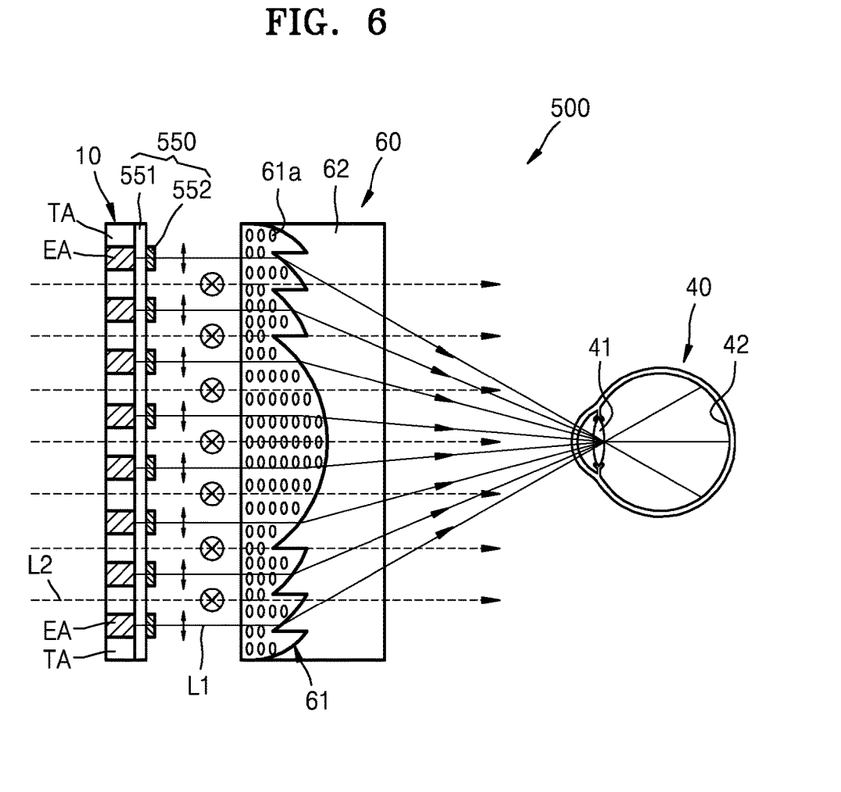
FIG. 6 is a schematic side-sectional view illustrating another alternative exemplary embodiment of a head-mounted display apparatus according to the invention.

FIG. 6 is a schematic side-sectional view illustrating another alternative exemplary embodiment of a head-mounted display apparatus 500 according to the invention.

Referring to FIG. 6, an exemplary embodiment of the head-mounted display apparatus 500 includes the display unit 10 including a plurality of emissive areas EA which displays images and a plurality of transmissive areas TA disposed between the emissive areas EA, and which transmits external light, the first optical element 550 which receives light emitted from the display unit 10, converts light L1 emitted from the emissive areas EA into polarized light in a first direction and converts external light L2 that has been transmitted through the transmissive areas TA into polarized light in a second direction perpendicular to the first direction, and the second optical element 60 which receives light that has been transmitted through the first optical element 550, converges the polarized light in the first direction onto a predetermined area and transmits the polarized light in the second direction substantially in the same direction as an incident direction thereof on the second optical element 60.

The first optical element 550 may include a polarizer 551 disposed to correspond to both the emissive areas EA and the transmissive areas TA and a λ/2 retarder 552 disposed to correspond to either emissive areas EA or transmissive areas TA.

According to an exemplary embodiment, the λ/2 retarder 552 may be disposed on areas corresponding to the emissive areas EA. Incident light falling on the polarizer 551 from the emissive areas EA and the transmissive areas TA may be converted into polarized light in the second direction by the polarizer 551. The light L1 emitted from the emissive areas EA is transmitted through the polarizer 551 and falls on the λ/2 retarder 552, and may be converted into polarized light in the first direction perpendicular to the second direction.

However, the invention is not limited thereto. In one alternative exemplary embodiment, for example, the λ/2 retarder 552 may be disposed on areas corresponding to the transmissive areas TA. Incident light falling on the polarizer 551 from the emissive areas EA and the transmissive areas TA may be converted into light polarized in the first direction by the polarizer 551. The external light L2 that has been transmitted through the transmissive areas TA is transmitted through the polarizer 551 and falls on the λ/2 retarder 552, and may be converted into polarized light in the second direction perpendicular to the first direction.

The display unit 10 and the second optical element 60 shown in FIG. 6 may have substantially the same configuration as that in the head-mounted display apparatus of FIG. 4, and any repetitive detailed description thereof will be omitted.

Figure 7:
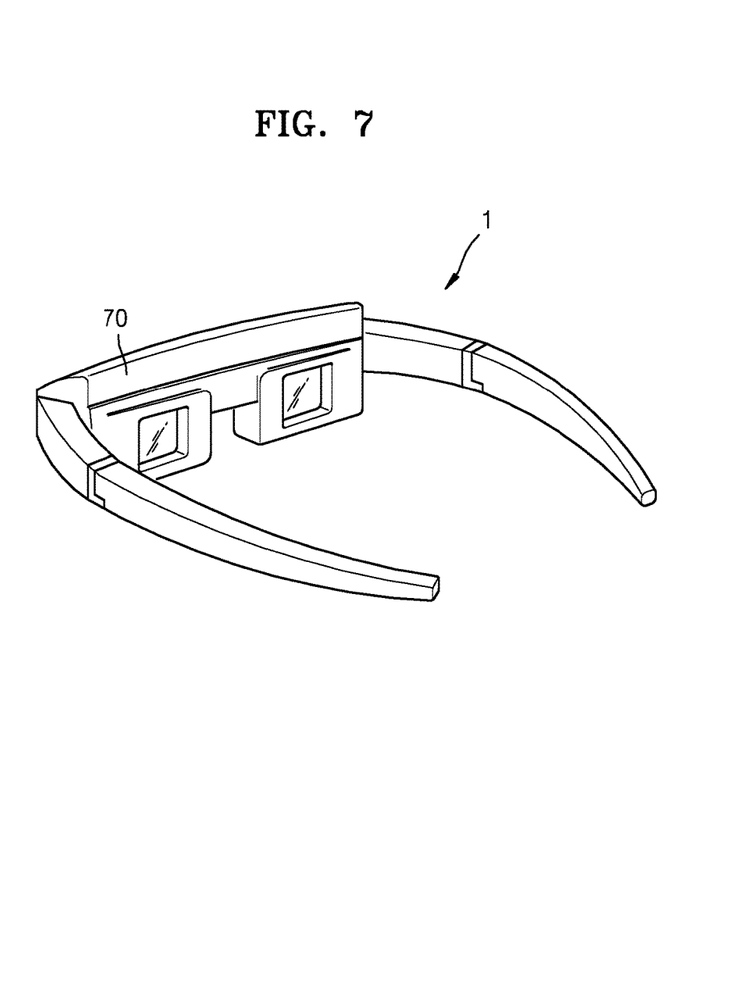
FIG. 7 is a schematic perspective view illustrating an exemplary embodiment of a head-mounted display apparatus according to the invention.

FIG. 7 is a schematic perspective view illustrating an exemplary embodiment of a head-mounted display apparatus 1 according to the invention.

Referring to FIG. 7, an exemplary embodiment of the head-mounted display apparatus 1 may include a frame 70 including the display unit 10, the first optical element 120 or 220, and the second optical element 130 or 230 or accommodating the display unit 10, the first optical element 350, 450 or 550, and the second optical element 60, and configured to be mounted on a user's head.

Exemplary embodiments of the head-mounted display apparatus 1, 100, 200, 300, 400, and 500 may enable a user to easily and clearly recognize not only an image displayed by the display unit 10, but also a background image that is transmitted through the display unit 10.

As described above, according to exemplary embodiments set forth herein, a see-through head-mounted display apparatus may be provided without distorting a background image. However, the scope of the inventive concept is not limited to this effect.

While one or more embodiments of the invention have been described with reference to the figures, it will be understood by those of ordinary skill in the art that various changes in form and details may be made therein without departing from the spirit and scope as defined by the following claims.

What is claimed is:

1. A head-mounted display apparatus comprising:
   a display unit comprising:
      a plurality of emissive areas which displays images; and
      a plurality of transmissive areas disposed between the emissive areas and which transmits external light;
   a first optical element which receives light from the display unit, wherein the first optical element converts light emitted from the emissive areas into a first polarized light, and converts the external light transmitted through the transmissive areas into a second polarized light, wherein the first polarized light is polarized in a first direction, and the second polarized light is polarized in a second direction different from the first direction; and
   a second optical element which receives light from the first optical element, wherein the second optical element converges the first polarized light onto a predetermined area, and transmits the second polarized light in a direction substantially the same as an incident direction thereof on the second optical element.

2. The head-mounted display apparatus of claim 1, wherein the first optical element comprises:
   a polarizer disposed to correspond to the emissive areas and the transmissive areas; and
   a liquid crystal layer which receives light transmitted through the polarizer and comprising:
      a first liquid crystal disposed to correspond to the emissive areas; and
      a second liquid crystal disposed to correspond to the transmissive areas.

3. The head-mounted display apparatus of claim 1, wherein the second optical element comprises:
   a first medium whose refractive index changes depending on a polarization direction of incident light; and
   a second medium in contact with the first medium and having a smaller refractive index than a maximum refractive index of the first medium.

4. The head-mounted display apparatus of claim 3, wherein the first medium comprises a liquid crystal.

5. The head-mounted display apparatus of claim 1, wherein the first optical element comprises:
   a polarizer disposed to correspond to the emissive areas and the transmissive areas; and
   a λ/2 retarder disposed to correspond to the emissive areas or the transmissive areas.

6. The head-mounted display apparatus of claim 1, wherein the first optical element comprises:
   a first polarizer disposed to correspond to the emissive areas and which converts light emitted from the emissive areas into the first polarized light; and
   a second polarizer disposed to correspond to the transmissive areas and which converts external light that transmitted through the transmissive areas into the second polarized light.

7. The head-mounted display apparatus of claim 6, wherein each of the first polarizer and the second polarizer comprises a wire grid polarizer.

8. The head-mounted display apparatus of claim 1, wherein the display unit comprises a plurality of pixels, and each of the plurality of pixels comprises:
   a first emission portion, a second emission portion and a third emission portion, which are disposed in the emissive areas; and
   a transmissive window disposed in the transmissive areas and adjacent to the first emission portion, the second emission portion and the third emission portion.

9. The head-mounted display apparatus of claim 1, further comprising:
   a frame which accommodates the display unit, the first optical element, and the second optical element and configured to be mounted on a user's head.

* * * * *